(12) United States Patent
Nelson (10) Patent No.: US 6,927,577 B2
(45) Date of Patent: Aug. 9, 2005

(54) DIGITAL NULLING PULSE INDUCTIVE METAL DETECTOR

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 17 days.

(21) Appl. No.: 10/942,145

(22) Filed: Sep. 16, 2004

(65) Prior Publication Data

US 2005/0104595 A1 May 19, 2005

Related U.S. Application Data

(60) Provisional application No. 60/505,187, filed on Sep. 23, 2003.

(51) Int. Cl.$^7$ ............................................... G01V 3/10
(52) U.S. Cl. ...................................... 324/329; 324/330
(58) Field of Search ............................. 324/326–331, 324/239, 360, 244, 260; 340/551, 552, 561

(56) References Cited

U.S. PATENT DOCUMENTS

| | | |
|---|---|---|
| 4,709,213 A | 11/1987 | Podhrasky |
| 4,868,910 A | 9/1989 | Maulding |
| 5,729,143 A | 3/1998 | Tavernetti et al. |
| 6,559,645 B2 | 5/2003 | Arndt et al. |
| 6,583,625 B1 | 6/2003 | Castle |
| 2001/0010460 A1 | 8/2001 | Miller et al. |
| 2003/0034778 A1 | 2/2003 | Nelson |

*Primary Examiner*—Bot LeDynh
(74) *Attorney, Agent, or Firm*—Albert J. Fasulo, II

(57) ABSTRACT

A method of improving pulse inductive metal detector sensitivity by minimizing adverse ground responses and transmitter coil transients is disclosed. The method provides a calibration mode for a typical pulsed EMI metal detector. The purpose of the calibration mode is to determine and record a nulling signal representative of the transmitter coil coupling to the receiver coil and a ground response that has no metal. The nulling signal is then used during normal operation of the metal detector by combining it with the instant receiver coil signal in a difference amplifier. The difference amplifier effectively subtracts the nulling signal from the instant signal yielding a response signal that has removed the ground response that may be present in the instant signal. The metal detector can be periodically re-calibrated. It may also be re-calibrated upon discovery of a metal target to provide the most up to date nulling signal for the ground around the metal target.

11 Claims, 5 Drawing Sheets

DIGITAL NULLING PULSE INDUCTIVE METAL DETECTOR

CROSS-REFERENCE TO RELATED APPLICATIONS

This application claims the benefit of U.S. provisional application No. 60/505,187, filed on Sep. 23, 2003, which is incorporated herein by reference in its entirety.

STATEMENT OF GOVERNMENTAL INTEREST

This invention was made with U.S. Government support under Army contract no. DAAB-15-00-C-1008. The U.S. Government has certain rights in this invention.

BACKGROUND

Figure 1:
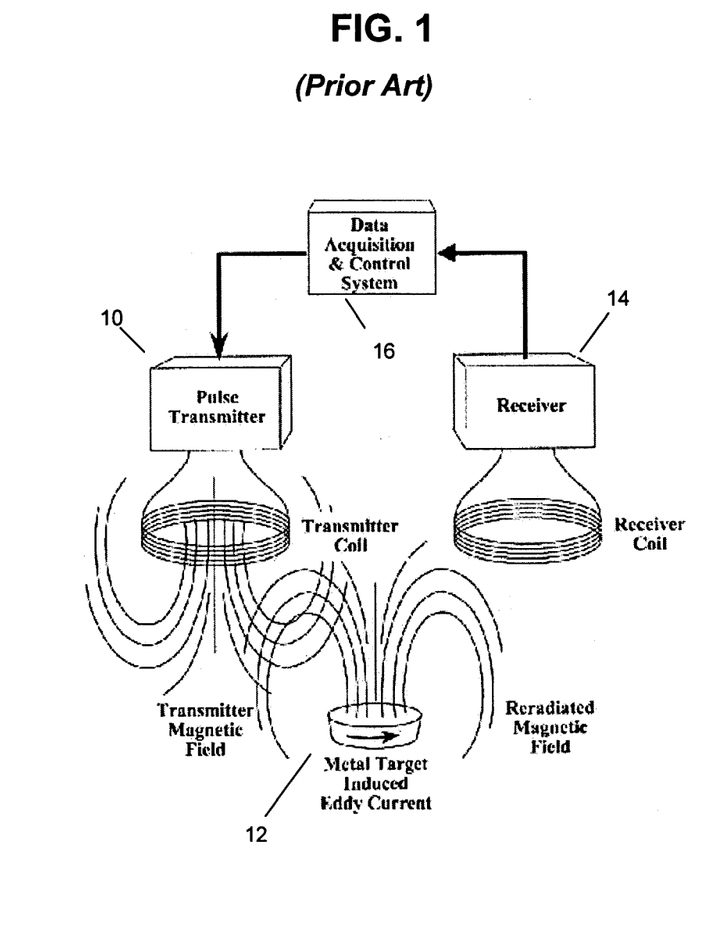
FIG. 1 illustrates a block diagram of a conventional pulsed EMI metal detector and method of operation.

FIG. 1 is a block diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform. For example, a square-wave, triangle or saw-tooth pulsed waveform, or a combination of different positive and negative current ramps.

According to Faraday's Law, the collapsing magnetic field induces an electromotive force (EMF) in nearby conductors, such as the metal target 12. This EMF causes eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

The measurement of these metal object magnetic field decay responses is used to not only detect the metal object but to also classify the metal object. Most metal detected in the environment is not useful. For example, this metallic trash or clutter includes rocks with high ferrous content, and metal from nails and cans. The detection and classification of metal is most important for treasure hunting (coins and jewelry), landmines and unexploded ordnance.

Figure 2A:
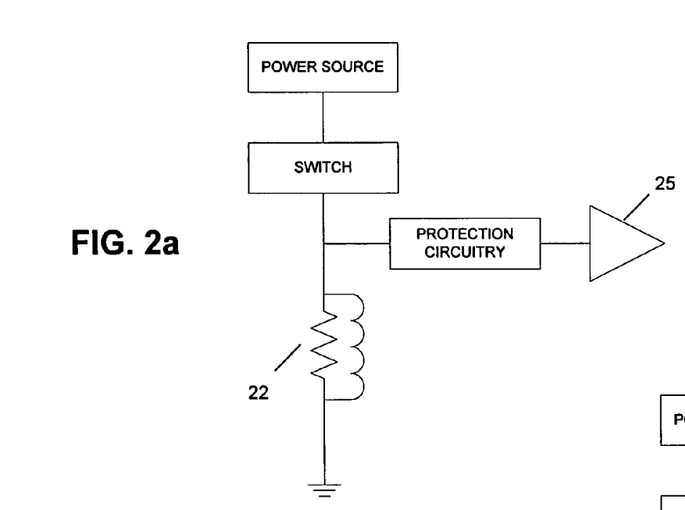
FIG. 2a illustrates a PIMD having a single transmit and receiver coil with multiple loops of wire forming the coil.
Figure 2B:
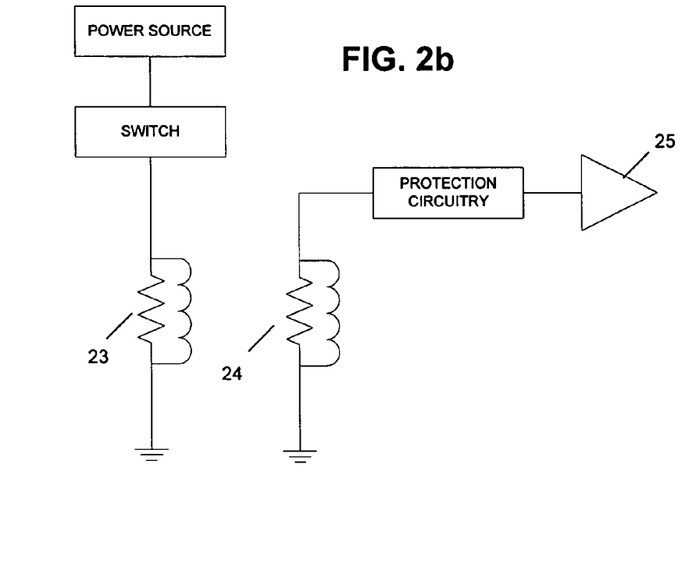
FIG. 2b illustrates a PIMD having a separate transmit and receiver coils with multiple loops of wire forming each coil.

Pulse induction metal detector (PIMD) sensors used for metal detection and classification come in two basic types as shown in FIGS. 2a and 2b. The first type of PIMD uses a single transmit and receiver coil 22 with multiple loops of wire forming the coil (FIG. 2a). A current pulse is sent through the multiple turn coil 22 and the received metal detection signal is sensed by the same coil 22. The small voltage generated by the metal target is typically amplified by a high gain electronic amplifier 25 (typical gain factor of 100 to 1000). A protection circuit is provided to protect the sensitive amplifier from the high kick-back voltage pulse generated by switching the inductive coil off abruptly (V=L di/dt, where L is the inductance of the transmitter coil and di/dt is the slope of the current decay in the coil). The second type of PIMD uses a separate transmitter coil 23 and receiver coil 24, again, with multiple loops of wire forming the coils (FIG. 2b). This configuration provides isolation between the transmitter circuit and the receiver circuit and allows for more flexibility in the receiver coil 24 (e.g., different number of turns, size or differential coil configuration) and amplifier circuit design (e.g., single ended operation of electronics). The high gain amplifier 25 also sees the high kick-back voltage pulse generated by switching the transmitter coil 23 off abruptly and protection circuitry is needed to protect it from damage. After amplification, both types of PIMDs measure the time decay response of the metal object for classification purposes using signal processing techniques known in the art.

Five basic problems exist with prior art PIMDs used for metal detection and classification. First, the high kick-back voltage of the transmitter coil 23 temporally "blinds" the receiver coil 24 from amplifying metal target signals near the turn-off time of the transmitter coil 23. The transmitter coil 23 is an impulse excitation to the receiver coil 24, and as such, the receiver coil 24 will have a decay voltage proportional to the inductance of the receive coil 24. Receiver coils typically have many turns for increased sensitivity and therefore, have relatively large inductances. For metal detectors designed to find low-metal objects such as landmines, these large decay voltages can persist for many microseconds and mask the signal from very small metal targets.

Second, the protection circuitry typically has a delay time that also temporarily "blinds" the receiver coil 24 from amplifying metal target signals near the turn-off time of the transmitter coil 23. Some protection circuitry uses switches to disconnect the receiver coil 24 from the amplifier 25 during the period that the kick-back voltage would cause amplifier saturation or damage. Low noise, high gain, low bandwidth amplifiers take time to come out of saturation which makes them "blind" to metal target signals. Other protection circuitry uses diodes to limit the voltage to the amplifier 25.

Third, a receiver coil 24 will have a voltage decay time proportional to the inductance of the coil 24 that will persist even after the coil comes out of saturation from the transmitter pulse. This residue voltage in the receiver coil 24 limits the amount of amplification that can be used in the receiver amplifier 25 before the amplifier 25 reaches saturation. Large amplifier gain is need to detect small metal objects.

Fourth, the receiver coil 24 residue time decay tend to mask the time decay response of the metal object.

Lastly, the time decay response from the soil can mask the time decay response of small metal objects. This is particularity true of mineralized soil, soil that has electrical and magnetic properties that have a response to electromagnetic induction excitation.

Most PIMD measure a short-term time average voltage from the receiver amplifier and sometimes subtract a long-term time average of the receiver amplifier to balance the ground response and residue receiver voltage. The long-term time average of the balancing amplifier has a time constant that is on the order of a one or two seconds. These type of PIMD do not have the capability to perform target classification based on measuring the time decay response of the metal object. The process of short- and long-term time averaging removes the time decay information in the metal object's response signal.

For PIMDs that measure the time decay signature of the metal object, current methods of canceling unwanted receiver coil response from the transmitter coil transients and mineralized soil include: (1) ignoring the unwanted signals by waiting a sufficiently long time (many microseconds) after the transmitter has been turned off and until the unwanted signals have decayed to an acceptable level; and (2) implement a balanced receiver coil arrangement such as a short base-line gradiometer with a single transmitter and two receiver coils.

Neither, however, improve on the detection and classification of metal targets near the transmitter turn-off transient and in the presence of mineralized soil.

SUMMARY

The present invention discloses a method of improving pulse inductive metal detector sensitivity and metal object classification potential by minimizing adverse ground responses and transmitter coil transients. The method provides a calibration mode for a typical pulsed EMI metal detector. The purpose of the calibration mode is to determine and record a time-series nulling signal representative of transmitter and ground responses that have no metal. The time-series nulling signal is then used during normal operation of the metal detector by combining it with the time-series instant receiver coil signal in a difference amplifier. The difference amplifier effectively subtracts the time-series nulling signal from the time-series instant signal yielding a time-series response signal that has removed the transmitter and ground response that may be present in the time-series instant signal. The resulting time-series instant signal contains the metal objects decay response used for object classification by conventional signal processing techniques. The metal detector can be periodically re-calibrated. It may also be re-calibrated upon discovery of a metal target to provide the most up to date time-series nulling signal for the transmitter and ground around the metal target.

DETAILED DESCRIPTION

Figure 3:
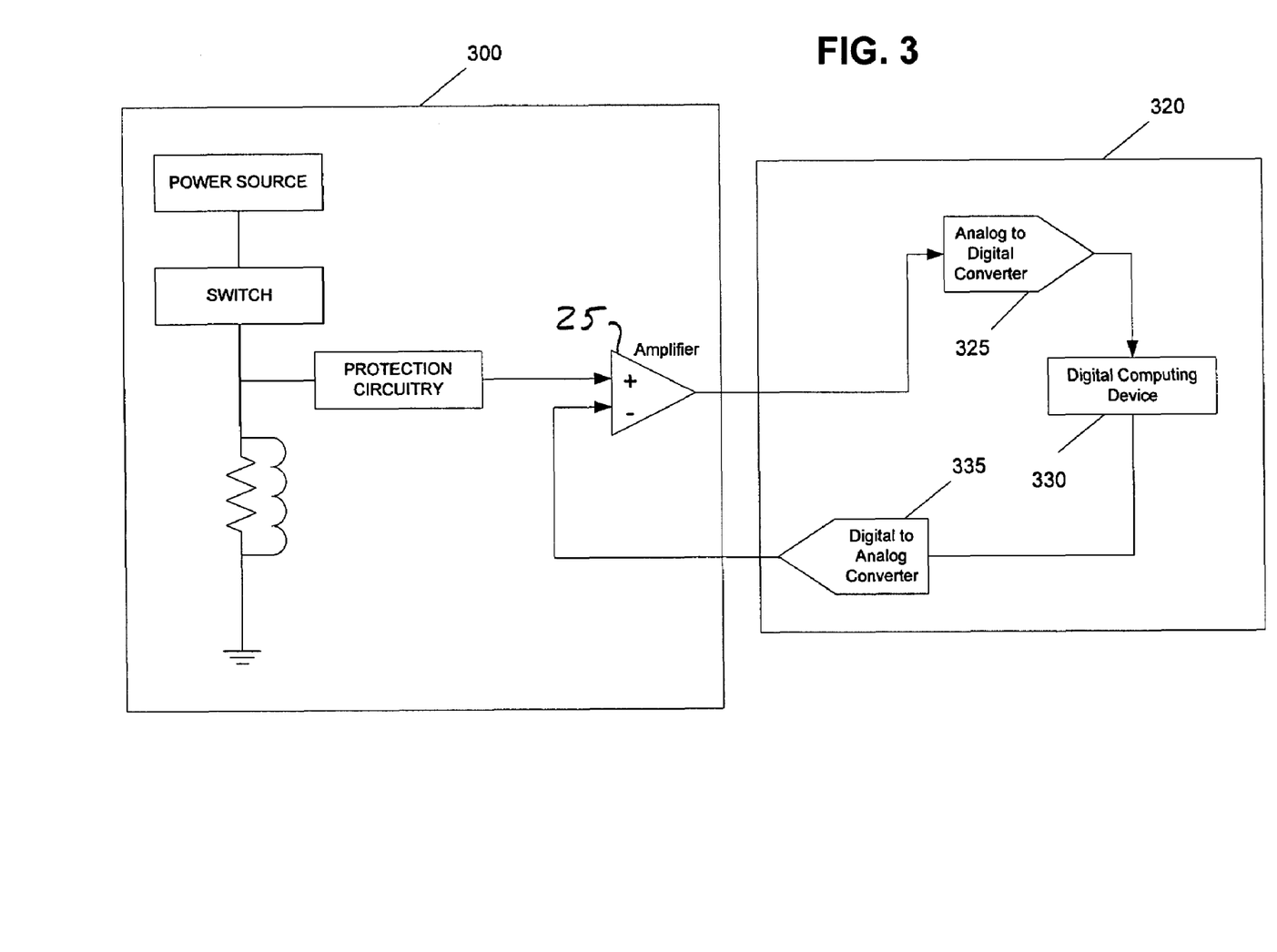
FIG. 3 illustrates a block diagram of a pulsed EMI metal detector and method of operation according to the present invention.

FIG. 3 is a block diagram of a metal detector in which the invention can be used. The outlined box 300 is a re-illustration of the conventional pulsed EMI metal detector shown in FIG. 2a. The conventional pulsed EMI metal detector shown in FIG. 2b would also work for the present invention. FIG. 2a was selected for illustrative purposes only. An embodiment of the present invention is depicted in the outlined box as a feedback circuit 320 which feeds a subtracting or negative input to the differential amplifier 25 of the receiver side of the pulsed EMI metal detector.

Figure 3A:
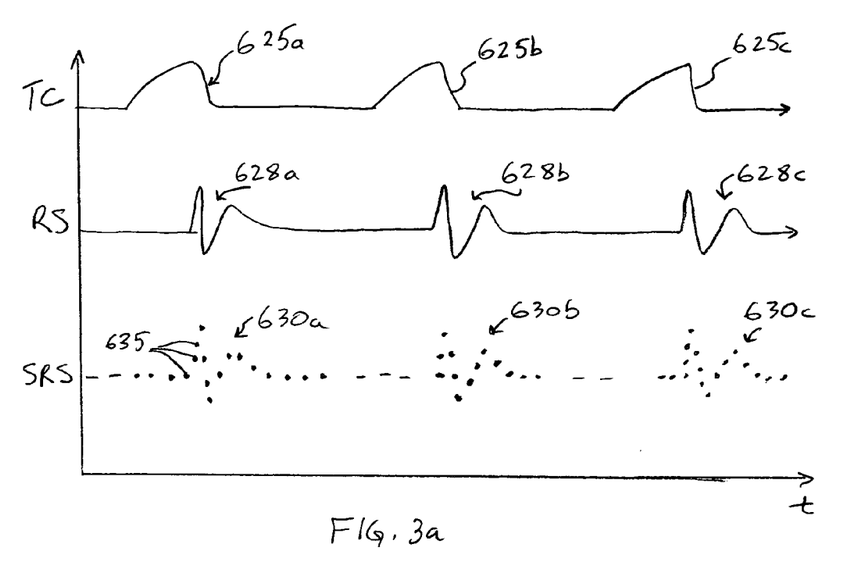
FIG. 3a illustrates metal detector signal timing waveforms corresponding to the operation of the EMI metal detector of FIG. 3.

The conventional pulsed EMI metal detector (FIG. 2a or 2b) yields an output DC analog signal from the receiver coil assembly (22 in FIG. 2a or 24 in FIG. 2b) that is fed to the differential or difference amplifier 25. At this point the present invention is applied. The operation of feedback circuit 320 is now described with reference to FIG. 3, and with further reference to FIGS. 3a and 3b.

During a calibration mode, in a first step, a metal detector operator places the metal detector sense head (i.e., transmitter and receiver coils) over ground or air that is known to be metal-free.

In a next step, the output of Digital-to-Analog Converter (DAC) 335 is set to zero, that is, the negative input of amplifier 25 is zero.

In a next step, the metal detector is operated in this metal-free environment to collect metal-free air or ground data. In this step, a transmit coil charging current is repeatedly applied to and then abruptly removed from the transmit coil to excite the metal-free air or ground. An exemplary transmit coil current waveform TC is depicted as a top trace in FIG. 3a. Waveform TC includes consecutive abrupt transmitter coil turn-off events 625a–c.

Such operation of the transmit coil generates in the receiver portion of the metal detector an analog receiver coil signature (also referred to as a metal-free receiver coil time series signal) corresponding to the metal-free air or ground. The receiver signature is indicative of background air or ground responses (such as mineralized ground responses) as well as responses due to transmitter transient decay voltages and DC offset voltages. An exemplary analog receiver coil signature RS is depicted as a middle trace in FIG. 3a. Receiver coil signature RS includes multiple consecutive responses 628a–c excited by corresponding transmitter coil turn-off events 625a–c, and indicates the response of the metal-free air or ground to the transmit coil excitation TC. Differential amplifier 25 passes the receiver coil signature from its positive input to its output, which is coupled to Analog-to-Digital Converter (ADC) 325. The negative input of difference amplifier 25, being set to zero, does not affect the output thereof because it is set to zero.

ADC 325 digitizes the receiver signature time series signal, to produce digitized receiver signature time series data, and provides the digitized time series data to a computing device 330. Exemplary digitized receiver signature time series data RSR, corresponding to receiver signature RS, is depicted as a bottom trace in FIG. 3a. The digitized time series samples are represented as small points or dots 635 in waveform RSR.

Figure 3B:
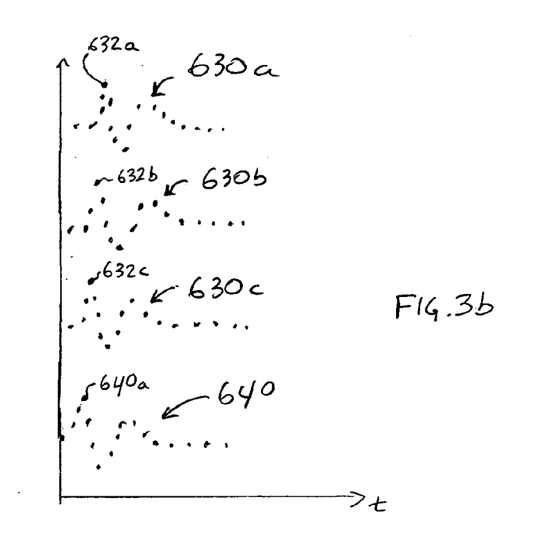
FIG. 3b illustrates metal detector signal timing waveforms useful for describing the present invention.

In a next step, computing device 330 determines a digitized time-series nulling signature to be used later during normal metal detection operation. Computing device 330 performs an ensemble or time-overlapped averaging of the digitized time series signatures to form an averaged metal-free digitized receiver signature, which represents the time-series nulling signature or signal. With reference to FIG. 3b, computing device 330 time-overlaps digitized receiver signatures 630, and averages the magnitudes of time-aligned samples therein, sample-by-sample, across time, to produce an averaged digitized receiver signature or time-series nulling signature (e.g., signature 640 in FIG. 3b) that can be used later for nulling purposes. For example, time-aligned samples 632a, 632b and 632c are averaged to produce time-aligned average sample 640a of signature 640, and so on across time for all of the samples. Computing device 330 stores the time-series nulling signature or signal in a memory. In an alternative embodiment, the nulling signature is derived based on only one receiver signature, that is without averaging multiple signatures. For example, the only one receiver signature may be stored as the nulling signature.

At this time, the calibration mode is complete, and the metal detector transitions to its normal operation (i.e., non-calibration mode) in which the user uses the metal detector to detect metal targets. In such normal operation, the stored nulling signature is used to improve the metal detection performance in a manner now described.

During normal operation, a transmit coil charging current is repeatedly applied to and then abruptly removed from the transmit coil in the same manner as described above, but in this case, to excite a target ground area to be searched. Synchronous with each abrupt transmitter coil turn-off event, computing device 330 accesses and then begins playing-back the stored nulling-signature (e.g., signature 640) through DAC 335, to produce an analog version of the nulling signature. DAC 335 applies the analog nulling signature to the negative input of difference amplifier 25. At the same time, the positive input of difference amplifier receives an analog time-series "instant" receiver coil signal indicative of the target ground response to the transmit coil excitation. As used herein, the term "synchronous" means that the instant receiver coil signal and the nulling signal are time-overlapped. The difference amplifier synchronously subtracts the applied time-series nulling signal from the time-series instant signal to produce a receiver response signal that has canceled out the background air or ground responses as well as minimized transmitter transient decay voltages and DC offset voltages. This synchronous playback and subtraction process repeats each time the transmit coil fires to excite an instant response in the receiver coil, such that the nulling signal repeatedly cancels background noise from the instant response.

The digital computing device 330 periodically goes into "calibration" mode over ground that is metal free and readjusts, i.e., re-determines, the time-series nulling signature. This is sometimes referred to as ground tracking. While not shown, additional gain could be provided by later stage amplifiers after the time-series nulling operation. This may improve small signal detection.

When a metal target is sensed by a pulsed EMI metal detector, the metal signature is a linear combination of the ground response and the metal target response. For accurate target classification, the ground response should be removed from the receiver coil voltage signature. The time-series ground nulling signal provided by the invention automatically provides for this ground signature subtraction.

When a metal target is found, the operator could move the sensor head over ground that does not contain metal and take another "calibration" reading to re-null the sensor.

Figure 4:
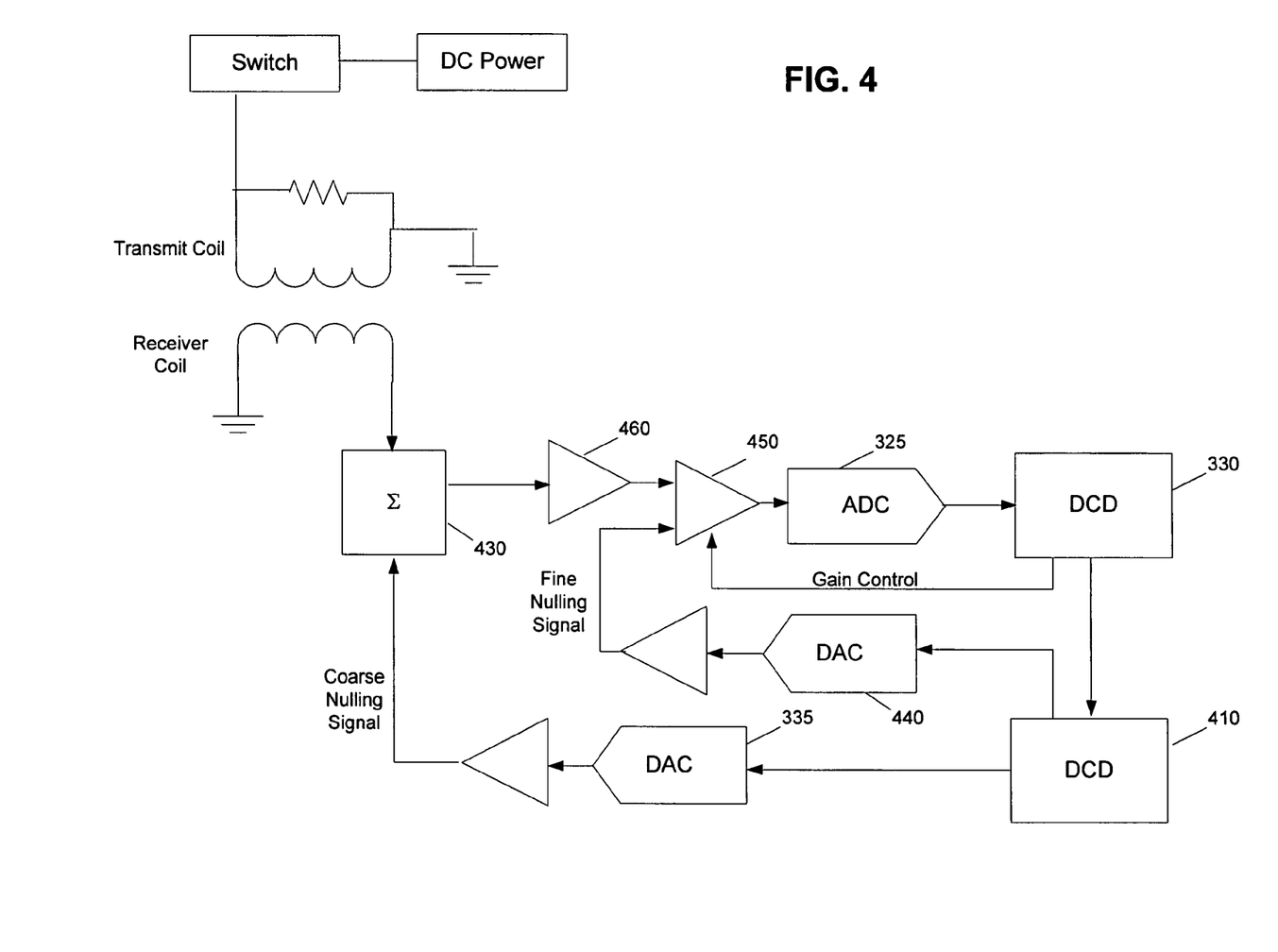
FIG. 4 illustrates a block diagram of a pulsed EMI metal detector and method of operation according to another embodiment of the present invention using a coarse and fine time-series null balancing.

FIG. 4 illustrates a block diagram of a pulsed EMI metal detector and method of operation according to another embodiment of the present invention using a coarse and fine time-series null balancing. In this embodiment, the digital computing device (DCD) 330 is the central sensor controller. It controls and collects data from the ADC 325 and the timing for all of the other subsystems. The EMI metal detector is first put into a coarse 'calibration and pulse nulling mode (or simply 'nulling mode')' with the metal detector antenna (transmitter and receiver coils) held up in the air away from metal objects and the ground. The coarse nulling removes the transmitter-to-receiver coupling signal which is typically very large compared to ground and metal responses. The DCD 330 averages the output of the receiver coil with no target and forms a nulling signal to be used to cancel transmitter-to-receiver coupling signal and system offsets, in the same manner as described above in connection with FIGS. 3, 3a and 3b.

When the in-air coarse nulling signal is finished forming, it is transferred to a second DCD 410 where the canceling signal is repeated every time the transmitter coil fires while a fine nulling signal is developed. A DAC 335 is used to convert the coarse nulling signal that is then fed to a summing junction 430. Summing junction 430 can be a simple resistor summing network and an operational amplifier or it can be a differential amplifier, etc. Once coarse nulling in air is finished, the fine nulling signal is similarly created using another DAC 440 and differencing in a differential amplifier 450. The fine nulling signal is created to offset ground responses and is accomplished in two steps, an initial ground response cancellation and a continuous ground response cancellation. The initial ground response cancellation is created by placing the EMI metal detector antenna near the ground at a height used for searching for metal. The antenna is held at a fixed location above the ground, and the coarse nulling signal operates in outer nulling loop including components 330, 335, 430, 460, 450, 325 and 330. The DCD 330 averages the output of the receiver coil with no metal target and forms a nulling signal to be used to cancel the ground signal, in the same manner as described above in connection with FIGS. 3, 3a and 3b. When the initial ground fine nulling signal is finished forming, it is transferred to a second DCD 410 where the canceling signal is repeated every time the transmitter coil fires. A DAC 440 is used to convert the fine nulling signal that is then fed to a differential amplifier 450. Or, the differential amplifier could be a summing junction like 430. At this point the metal detector has been calibrated and ground nulled and is ready to perform metal detection.

In normal operation, the coarse nulling signal is played back through DCD 330, DAC 335 and into junction 430. Concurrently, the fine nulling signal is played back through DCD 410, DAC 440 and into junction 325. Together, the synchronously played coarse and fine nulling signals cancel out background noise and transients each time the transmitter fires in a search mode. The sensor antenna is typically swept back-and-forth over the ground in a metal detection search mode. Typically, the ground does not have a uniform EMI spatial response. To account for spatial variation in the ground response signal as the metal detector performs a search, the DCD 330 continues to collect signal averages from the receiver coil and periodically sends an updated average ground nulling signal to DCD 410 which in turn sends a new signal to DAC 440 to fine null the metal detector. The periodicity of the updated ground fine nulling signal is a function of the averaging time, ground spatial variation and the speed of the sweeping operation. A time constant of about 0.5 to 1 second is typically used in conventional metal detectors and can be adjusted by the operator or an automatic algorithm in the DCD 330. With the coarse and fine nulling, very small metal objects can be detected in the presence of transmitter-to-receiver coupling and ground signals. When a receiver signal exceeds a pre-set amplitude threshold, a metal object has been detected. The metal detection function can be implemented using DCD 330.

An advantage of the two stage coarse and fine nulling is the fact that a lower resolution DAC (~8–10 bit) could be used for DAC 325, 335 and 440 for speed and economy.

A variable gain amplifier 460 is included in the gain chain when large amounts of metal are in the environment and need to be nulled out of the sensor so that small metal content items can be detected. The system starts at a low gain, nulls the response, ups the gain, nulls the response, repeatedly until the maximum desired gain is reached.

The receiver coil is protected so that the output of the receiver coil is relatively low. If the receiver coil was not protected, it could see several hundred volts of signal due to high di/dt from the transmitter coil. One method of protecting the receiver coil is to use a switched coil receiver configuration that is the subject of a co-pending application. Another method is to use diodes to limit the output of the receiver coil.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of improving metal detection sensitivity in a pulse inductive metal detector, the metal detector including a transmitter coil configured to induce inductive target responses in a receiver coil, the method comprising:

during a calibration mode
 (a) inducing one or more analog time-series signal responses of the receiver coil over an area known to be metal-free;
 (b) digitizing the one or more analog time-series signal responses; and
 (c) determining a digitized time-series nulling signal based on the one or more digitized time series signal responses from step (b); and then during a normal operating mode used to detect metal targets
 (d) inducing an analog instant time-series signal response of the receiver coil over a target search area;
 (e) converting the digitized nulling signal to an analog nulling signal; and
 (f) synchronously subtracting the analog nulling signal from the analog instant time-series signal response to produce a time-series signal response having reduced adverse ground or transmitter coil transient responses.

2. The method of claim 1 further comprising periodically repeating steps (a) through (c), thereby periodically determining the nulling signal.

3. The method of claim 1, wherein:
 step (a) includes inducing multiple analog time-series signal responses of the receiver coil over an area known to be metal-free; and
 step (c) comprises averaging the multiple digitized time series signal responses.

4. The method of claim 3, wherein said averaging comprises:
 time-overlapping the multiple digitized time series signal responses; and
 averaging magnitudes of time-aligned samples of the multiple digitized time series signal responses, to produce the digitized time-series nulling signal.

5. The method of claim 1 further comprising further amplifying the time-series response signal to assist in detecting small metal targets.

6. The method of claim 1, further comprising, between steps (c) and (d):
 storing the digitized time-series nulling signal; and then accessing the stored digitized time-series nulling signal.

7. A pulse inductive metal detector including a transmitter coil configured to induce inductive target responses in a receiver coil, comprising:

(a) means for inducing, in a calibration mode, one or more analog time-series signal responses of the receiver coil over an area known to be metal-free;
 (b) means for digitizing, in the calibration mode, the one or more analog time-series signal responses; and
 (c) means for determining, in the calibration mode, a digitized time-series nulling signal based on the one or more digitized time series signal responses from step (b);
 (d) means for inducing, in a normal operating mode, an analog instant time-series signal response of the receiver coil over a target search area;
 (e) means for converting, in the normal operating mode, the digitized nulling signal to an analog nulling signal; and
 (f) means for synchronously subtracting, in the normal operating mode, the analog nulling signal from the analog instant time-series signal response to produce a time-series signal response having reduced adverse ground or transmitter coil transient responses.

8. A pulse inductive metal detector capable of greater sensitivity and metal classification by minimizing adverse ground responses and transmitter coil transients, the pulse inductive metal detector comprising:
 a time-series nulling calibration circuit that operates on receiver coil signals when the pulse inductive metal detector is in a calibration mode, the time-series nulling calibration circuit comprising:
 an analog to digital converter that receives a time-series receiver coil signal during calibration mode and converts it to a time-series digital signal; and
 a digital-to-analog converter that is initially set to zero before receiving the calibration mode digitized receiver coil time-series signal converting it to an analog time-series nulling signal,
 wherein the pulse inductive metal detector stores the analog time-series nulling signal and applies it to a difference amplifier when the pulse inductive metal detector is operating in a normal mode such that the time-series nulling signal is synchronously subtracted from an instant time-series receiver coil signal yielding a time-series response signal that minimizes transmitter transient decay voltages and DC offset voltages.

9. The pulse inductive metal detector of claim 8 wherein the analog time-series nulling signal is periodically re-determined.

10. The pulse inductive metal detector of claim 8 further comprising additional gain amplifiers to amplify the time-series response signal to assist in detecting small metal targets.

11. A method of improving metal detection sensitivity in a pulse inductive metal detector, the metal detector including a transmitter coil configured to induce inductive target responses in a receiver coil, the method comprising:

During a Coarse Calibration Mode
 (a) inducing multiple responses of the receiver coil in air;
 (b) digitizing the multiple air responses;
 (c) averaging the multiple digitized air responses into a digitized coarse nulling signal;

During a Fine Calibration Mode
 (d) inducing multiple responses of the receiver coil near a ground area absent a metal target;
 (e) converting the digitized coarse nulling signal to an analog coarse nulling signal;

(f) subtracting the analog coarse nulling signal from each of the multiple ground responses from step (d), to produce multiple adjusted ground responses;

(g) digitizing each of the multiple adjusted ground responses; and (h) averaging the multiple digitized adjusted ground responses into a digitized fine nulling signal;

During a Normal Operating Mode used to detect metal targets (i) inducing a signal response of the receiver coil over a target search area;

(j) converting the digitized coarse nulling signal and the digitized fine nulling signal respectively to an analog coarse nulling signal and an analog coarse nulling signal; and (k) synchronously subtracting the analog coarse and fine nulling signals from the signal response from step (i) to reduce therein background noise and transmitter coil transient responses.

* * * * *